(12) United States Patent
Yoneyama

(10) Patent No.: US 8,730,315 B2
(45) Date of Patent: May 20, 2014

(54) MICROSCOPE APPARATUS AND MICROSCOPE OBSERVATION METHOD

(75) Inventor: Takashi Yoneyama, Tokyo (JP)

(73) Assignee: Olympus Corporation, Tokyo (JP)

( * ) Notice: Subject to any disclaimer, the term of this patent is extended or adjusted under 35 U.S.C. 154(b) by 543 days.

(21) Appl. No.: 12/908,307

(22) Filed: Oct. 20, 2010

(65) Prior Publication Data

US 2011/0102571 A1    May 5, 2011

(30) Foreign Application Priority Data

Oct. 29, 2009   (JP) .................................. 2009-249348

(51) Int. Cl.
*H04N 7/18* (2006.01)
*H04N 5/30* (2006.01)

(52) U.S. Cl.
USPC .................. 348/79; 348/61; 348/63; 348/64

(58) Field of Classification Search
USPC .............. 348/79; 359/379, 383, 380; 382/312
IPC ........................................................ H04N 7/18
See application file for complete search history.

(56) References Cited

U.S. PATENT DOCUMENTS

| | | | |
|---|---|---|---|
| 6,259,080 B1 | 7/2001 | Li et al. | |
| 6,980,359 B2 * | 12/2005 | Yoneyama et al. | 359/379 |
| 7,167,305 B2 | 1/2007 | Ogihara | |
| 7,345,814 B2 * | 3/2008 | Yoneyama et al. | 359/383 |
| 7,388,599 B2 * | 6/2008 | Maddison et al. | 348/79 |
| 7,949,161 B2 * | 5/2011 | Kawanabe et al. | 382/128 |
| 8,106,942 B2 * | 1/2012 | Cooke et al. | 348/79 |
| 2006/0007345 A1 | 1/2006 | Olson | |
| 2006/0045388 A1 * | 3/2006 | Zeineh et al. | 382/312 |
| 2006/0204072 A1 | 9/2006 | Wetzel | |
| 2007/0206843 A1 | 9/2007 | Douglass | |
| 2007/0285769 A1 * | 12/2007 | Shirota et al. | 359/380 |
| 2008/0187208 A1 | 8/2008 | Shirota | |

FOREIGN PATENT DOCUMENTS

| | | |
|---|---|---|
| JP | H09-113810 | 5/1997 |
| JP | H9-281405 | 10/1997 |
| JP | 2001-091846 | 4/2001 |

(Continued)

OTHER PUBLICATIONS

The extended European Search Report by the European Patent Office, issued on Feb. 14, 2011, in the European patent application No. 10013860.1.

(Continued)

*Primary Examiner* — Thao X Le
*Assistant Examiner* — Long Le

(57) ABSTRACT

The number of seams between magnified images in a created virtual slide is reduced to make the virtual slide clear and sharp. Provided is a microscope apparatus including an objective lens that collects light from a sample on a slide; a focus position detecting section that detects a focus position of the objective lens with respect to the sample; a focus state adjustment section that adjusts a focus state with respect to the sample based on a detection result from the focus position detecting section; and a magnified-image acquisition section that acquires a magnified image of each part of the sample, in which, if the focus position detected by the focus position detecting section is changed by more than a predetermined threshold with respect to a focus state in which an adjacent magnified image was obtained, the focus state adjustment section limits the adjustment in the focus state to the predetermined threshold or less.

8 Claims, 4 Drawing Sheets

(56) References Cited

FOREIGN PATENT DOCUMENTS

| | | |
|---|---|---|
| JP | 2001-091856 | 4/2001 |
| JP | 2004-317970 | 11/2004 |
| JP | 2006-053197 | 2/2006 |
| JP | 2007-047447 | 2/2007 |
| JP | 2008191427 A | 8/2008 |
| JP | 2009-145754 | 7/2009 |
| WO | 9720198 | 6/1997 |
| WO | 2005119325 | 12/2005 |

OTHER PUBLICATIONS

The English translation of the Japanese Office Action, issued on Jul. 9, 2013, in the corresponding Japanese application No. 2009-249348.

* cited by examiner

MICROSCOPE APPARATUS AND MICROSCOPE OBSERVATION METHOD

BACKGROUND OF THE INVENTION

1. Field of the Invention

The present invention relates to a microscope apparatus and a microscope observation method.

This application is based on Japanese Patent Application No. 2009-249348, the content of which is incorporated herein by reference.

2. Description of Related Art

In a conventionally known virtual slide generation device, a sample on a slide is divided into a plurality of small regions, image acquisition is performed for each of the small regions, and acquired high-definition magnified images are combined to create a virtual image of the entire sample (see Japanese Unexamined Patent Application, Publication No. 2008-191427).

In the conventional virtual slide generation device, a focus error is corrected through automatic focusing for each of the small regions to acquire a sharp magnified image; however, if the focal positions obtained through the automatic focusing are different between adjacent magnified images acquired for adjacent small regions, in some cases, a seam is formed between the magnified images in the eventually created virtual slide.

BRIEF SUMMARY OF THE INVENTION

According to one aspect, the present invention provides a microscope apparatus including: an objective lens that collects light from a sample on a slide; a focus position detecting section that detects a focus position of the objective lens with respect to the sample; a focus state adjustment section that adjusts a focus state with respect to the sample based on a detection result from the focus position detecting section; and a magnified-image acquisition section that acquires a magnified image of each part of the sample, in which, if the focus position detected by the focus position detecting section is changed by more than a predetermined threshold with respect to a focus state in which an adjacent magnified image was obtained, the focus state adjustment section limits the adjustment in the focus state to the predetermined threshold or less.

The predetermined threshold is, for example, a depth of focus of the objective lens.

In the above-described aspect, an image combining section that generates a virtual slide of the sample by combining the plurality of magnified images acquired by the magnified-image acquisition section may be further included.

In the above-described aspect, when a plurality of adjacent magnified images exist, the focus state adjustment section may limit the adjustment in the focus state to the predetermined threshold (for example, the depth of focus of the objective lens) or less, with respect to a focus position obtained when an adjacent magnified image having the largest amount of change in focus position was acquired.

In the above-described aspect, the magnified-image acquisition section may be driven so as to sequentially acquire magnified images of adjacent regions in the sample on the slide.

In the above-described aspect, the focus state adjustment section may cancel the focus state adjustment limitation when the amount of change in focus position exceeds the predetermined threshold (for example, the depth of focus of the objective lens) a plurality of times in a row, in acquiring three or more consecutive adjacent magnified images.

According to another aspect, the present invention provides a microscope observation method including the steps of: detecting a focus position of an objective lens that collects light from a sample on a slide, with respect to the sample; determining whether the detected focus position is changed by more than a predetermined threshold (for example, a depth of focus of the objective lens) with respect to a focus state in which an adjacent magnified image was acquired; adjusting the focus state so as to match the detected focus position when the amount of change in focus position is the predetermined threshold (for example, the depth of focus of the objective lens) or less, and limiting the adjustment in the focus state to the predetermined threshold (for example, the depth of focus of the objective lens) or less when the amount of change in focus position exceeds the predetermined threshold; and acquiring a magnified image of the sample, for which the focus state has been adjusted.

The predetermined threshold is, for example, a depth of focus of the objective lens.

DETAILED DESCRIPTION OF THE INVENTION

A microscope apparatus 1 and a microscope observation method according to one embodiment of the present invention will be described below with reference to the drawings.

Figure 1:
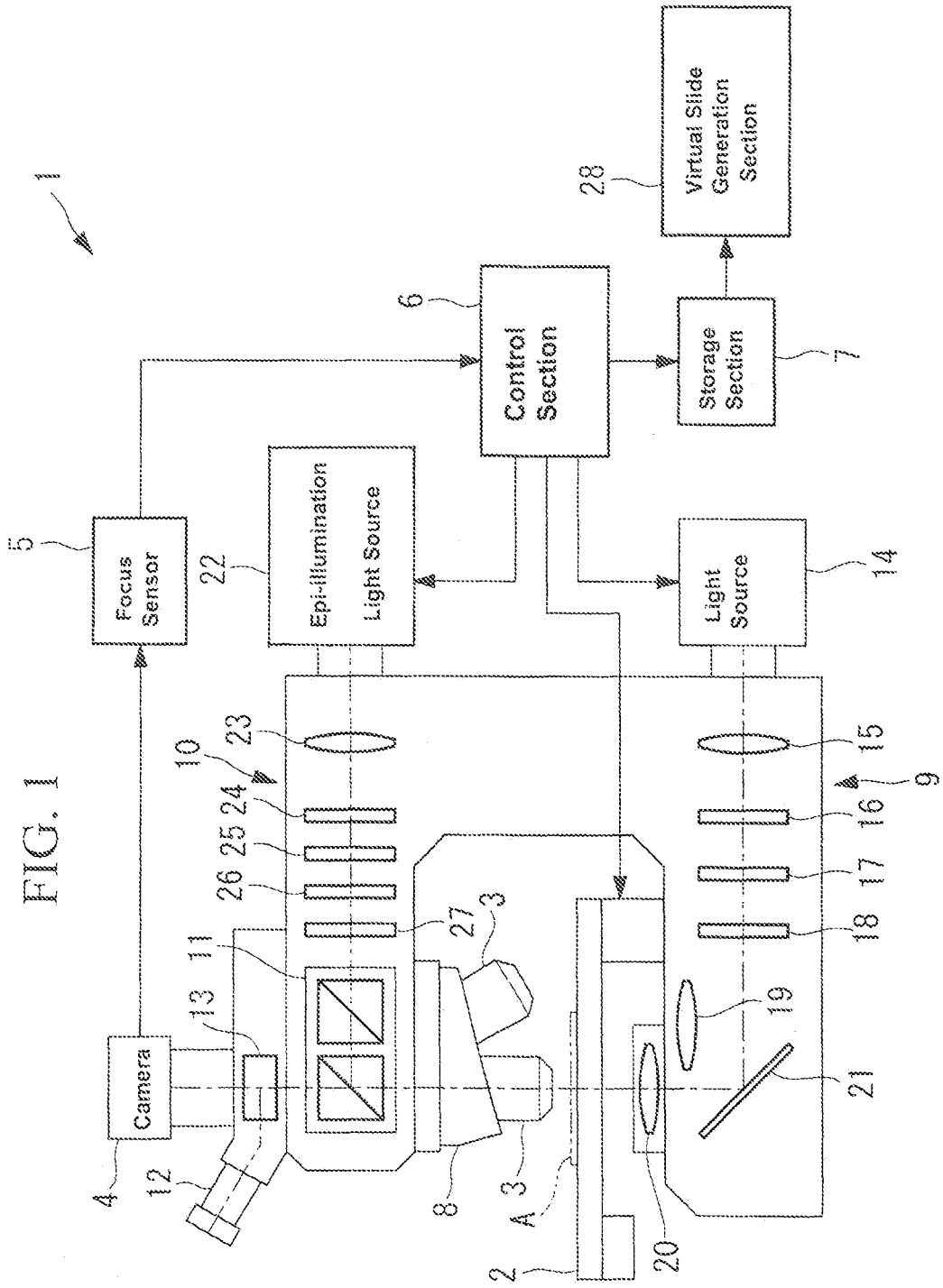
FIG. 1 is an overall configuration diagram of a microscope apparatus according to one embodiment of the present invention.

As shown in FIG. 1, the microscope apparatus 1 according to this embodiment includes a stage 2 on which a slide A having a sample put thereon is placed, an objective lens 3 disposed facing the slide A placed on the stage 2, a camera (magnified-image acquisition section) 4 that detects light coming from the sample and collected by the objective lens 3 to acquire a magnified image, a focus sensor (focus position detecting section) 5 that detects a focus position of the objective lens 3 with respect to the sample, a control section (focus state adjustment section) 6 that adjusts the focus state based on a detection result from the focus sensor 5, and a storage section 7 that stores a magnified image that is acquired by the camera 4 when its focus state is adjusted by the control section 6.

The stage 2 has a mechanism for moving the slide A in both an optical axis direction (vertical direction) of the objective lens 3 and a direction (horizontal direction) orthogonal thereto.

The objective lens 3 is disposed above the stage 2 with a gap therebetween so as to align the optical axis thereof with the vertical direction. A plurality of objective lenses 3 having different magnifications are prepared and selectively disposed facing the stage 2 by means of a revolver 8.

The camera 4 has a CCD, for example, and acquires magnified images of partial small regions B of the sample from which light is collected by the objective lens 3.

Figure 2:
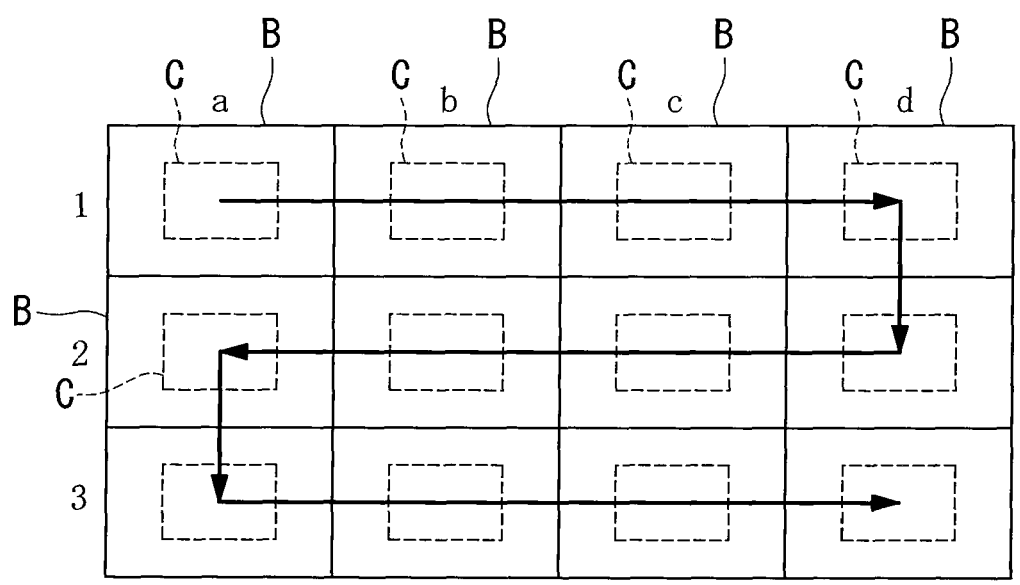
FIG. 2 is a diagram showing an example order for acquiring magnified images with the microscope apparatus shown in FIG. 1.

The focus sensor 5 detects, for example, the contrast in each of the magnified images of the partial small regions B of the sample, acquired by the camera 4, and, as a focus position, detects a position at which the contrast is the maximum. In FIG. 2, reference symbol C denotes a contrast detection range in which the focus sensor 5 detects the focus position of each small region B.

The control section 6 moves the stage 2 in two horizontal directions according to a predetermined schedule such that the optical axis of the objective lens 3 is sequentially aligned with the centers of the small regions B on the sample, which are specified in advance. In an example shown in FIG. 2, the control section 6 moves the stage 2 to acquire the images of the small regions B in order of a1, b1, c1, d1, d2, c2, b2, a2, a3, b3, c3, and d3.

The control section 6 receives information about a focus position output from the focus sensor 5 at the time when the optical axis of the objective lens 3 is aligned with the center of each small region B, and, if the magnified image of an adjacent small region B has already been acquired, determines whether the focus position has changed by more than a predetermined threshold, with respect to the focus state in which the adjacent magnified image was acquired.

If the focus position has changed by the predetermined threshold or less, or if the magnified image of an adjacent small region B has not been acquired, the control section 6 moves the stage 2 in an up-and-down direction (vertical direction) to adjust the focus state so as to match the detected focus position. On the other hand, if the focus position has changed by more than the predetermined threshold, the control section 6 adjusts the focus state so as to fall within the range of the depth of focus of the objective lens 3. As the predetermined threshold, for example, the depth of focus of the objective lens 3 just needs to be specified.

When a plurality of adjacent magnified images exist, the control section 6 adjusts the focus state such that the maximum amount of change in the focus position with respect to the focus state in which any of the adjacent magnified images was acquired is equal to or less than the predetermined threshold.

When the amount of change in the focus position with respect to the focus state in which an adjacent magnified image was acquired exceeds the predetermined threshold a predetermined number of times, for example, twice, in a row, the control section 6 adjusts the focus state so as to match the detected focus position.

The storage section 7 stores a magnified image acquired at the position of each small region B and also stores the focus state in which the magnified image was acquired, in association therewith. As the focus state, the vertical position of the stage 2 at which the magnified image was acquired is stored.

Figure 3A:
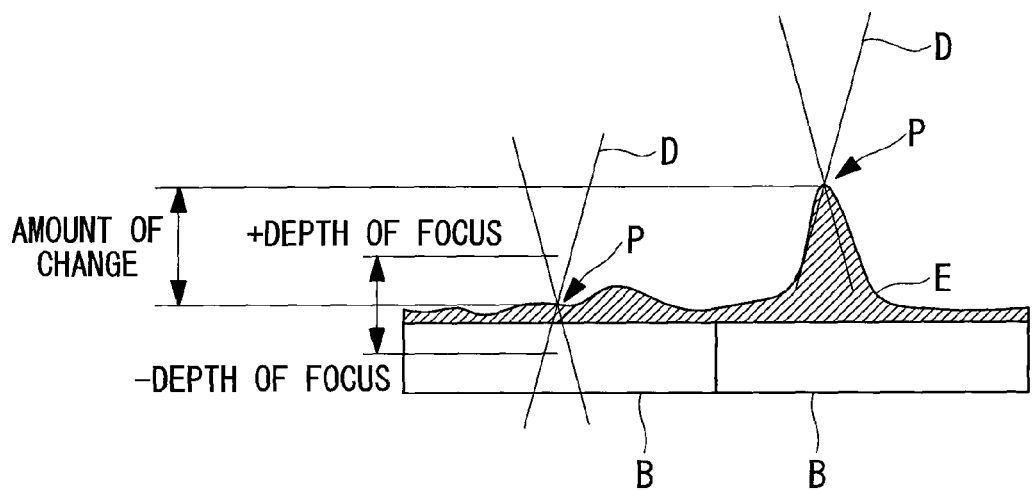
FIG. 3A is a diagram for explaining a focus state adjustment operation executed by the microscope apparatus shown in FIG. 1 and shows a case where a change in focus position between adjacent two small regions exceeds the depth of focus of an objective lens.
Figure 3B:
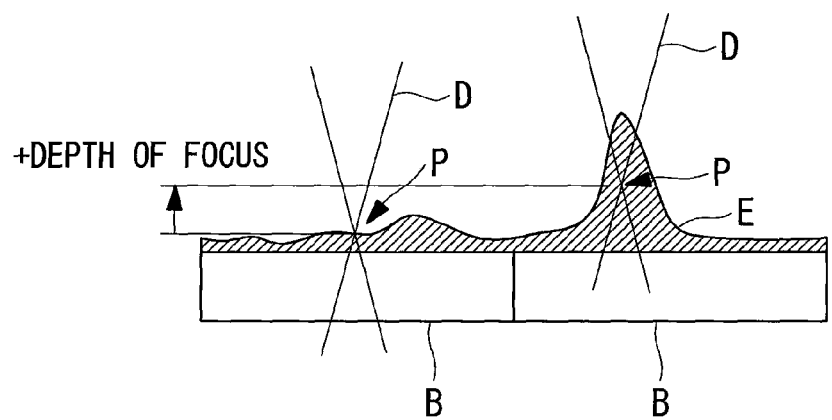
FIG. 3B is a diagram for explaining the focus state adjustment operation executed by the microscope apparatus shown in FIG. 1 and shows a case where the adjustment in focus state between the adjacent two small regions is limited.

For example, in a case where the depth of focus of the objective lens 3, which serves as the predetermined threshold, is $\pm 10$ μm, and the focus state in which an adjacent magnified image was acquired indicates the original position of the stage 2, if the amount of change in the focal position with respect to this focus state is $+30$ μm, as shown in FIG. 3A, the adjustment in focus state is limited to $+10$ μm, as shown in FIG. 3B. Then, the stage 2 is lowered by 10 μm to acquire a magnified image, and a focus state of $+10$ μm at this time is stored. If the amount of change in the focal position is $+8$ μm, the stage 2 is lowered by 8 μm to make the focus state match a focus position of $+8$ μm, and a focus state of $+8$ μm is stored. In the figures, reference symbol D denotes an example light flux for indicating a focal position P of the objective lens, and reference symbol E denotes a sample.

On the other hand, in a case where the amount of change in the focal position with respect to one small region B is $+30$ μm, and the adjustment in the focus state is limited to $+10$ μm by the control section 6, if the amount of change in the focal position with respect to the next adjacent small region B is $+20$ μm from the stored previous focus state, that is, the stored previous position of the stage 2, the focus state is adjusted so as to match the focus position without limiting the adjustment in focus state to $+10$ μm.

The microscope apparatus 1 includes a transmission observation optical system 9, an epi-illumination observation optical system 10, a cube unit 11 that changes the microscopic observation method, an eyepiece lens 12, and a beam splitter 13 that branches an observation light path into an eyepiece lens 12 side and a camera 4 side.

The transmission observation optical system 9 includes a transmission-illumination light source 14, a collector lens 15 that collects illumination light from the transmission-illumination light source 14, a transmission filter unit 16, a transmission field stop 17, a transmission aperture stop 18, a condenser optical element unit 19, and a top lens unit 20. In the figure, reference numeral 21 denotes a mirror.

The epi-illumination observation optical system 10 includes an epi-illumination light source 22, a collector lens 23, an epi-illumination filter unit 24, an epi-illumination shutter 25, an epi-illumination field stop 26, and an epi-illumination aperture stop 27. Reference numeral 28 denotes a virtual slide generation section that generates a virtual slide by combining magnified images stored in the storage section.

The microscope observation method using the thus-configured microscope apparatus 1 of this embodiment will now be described.

Figure 4:
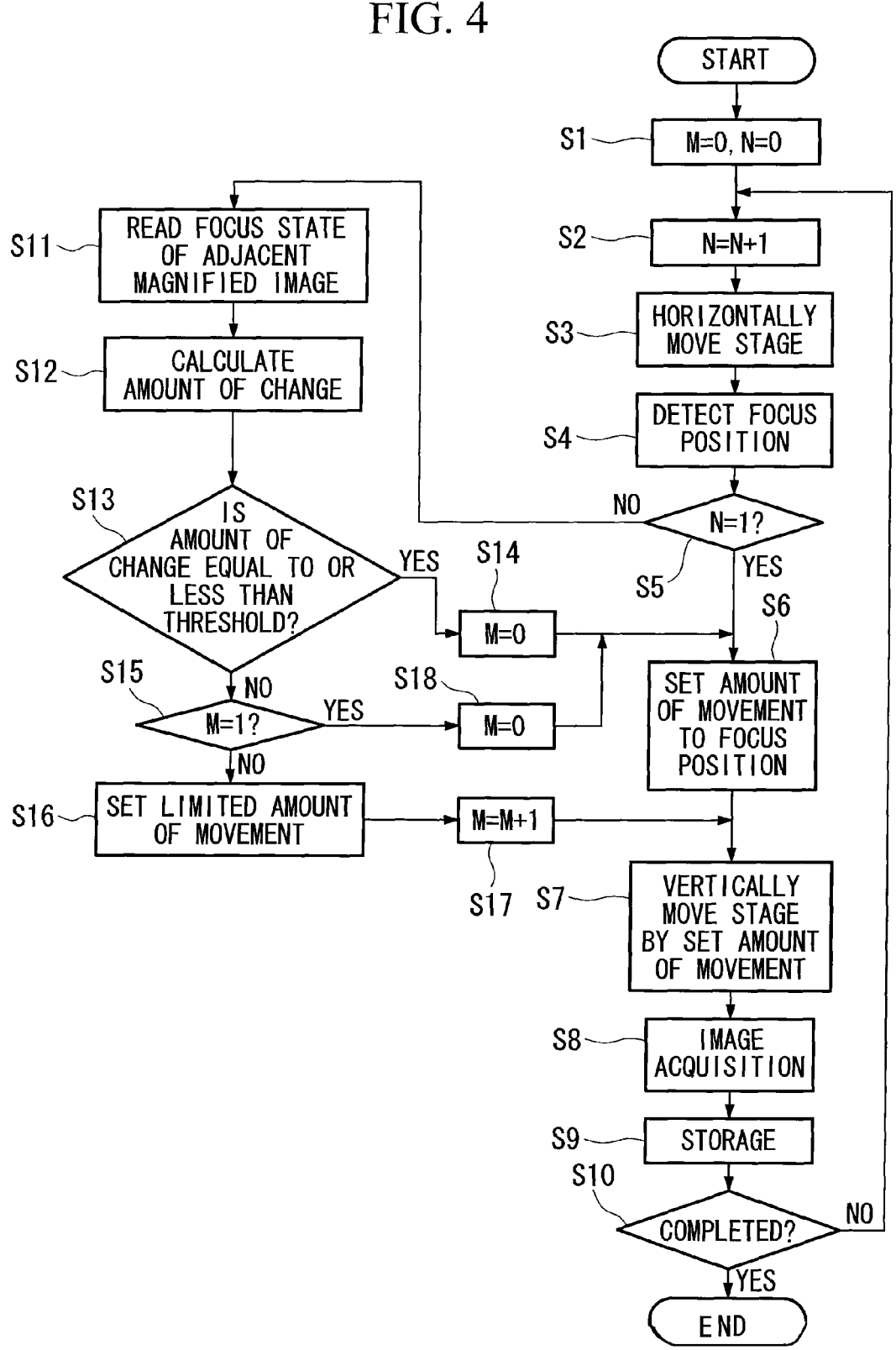
FIG. 4 is a flowchart for explaining a microscope observation method using the microscope apparatus shown in FIG. 1.

In order to acquire a plurality of magnified images using the microscope apparatus 1 of this embodiment, as shown in FIG. 4, the control section 6 initializes values (Step S1), increments a counter N (Step S2), horizontally moves the stage 2 such that the optical axis of the objective lens 3 is aligned with the center of any small region B on the sample according to an order specified in advance (Step S3), and irradiates the sample with illumination light by using the transmission observation optical system 9 or the epi-illumination observation optical system 10.

When light transmitted through or light reflected from the sample irradiated with illumination light is excitation light or when the illumination light itself is excitation light, fluorescence produced in the sample is collected by the objective lens 3 and an image of the fluorescence is acquired by the camera 4.

The focus sensor 5 calculates the contrast in each of the magnified images acquired while the stage 2 is moved in the vertical direction, and, as the focus position, detects a position at which the contrast is the maximum (Step S4).

It is determined whether the magnified image acquired at this position is a first magnified image (Step S5). If the magnified image is a first magnified image, specifically, if there is no adjacent magnified image that has already been acquired, the amount of movement to a position matching the focus position detected by the focus sensor 5 is specified (Step S6). The control section 6 moves the stage 2 in the vertical direction by the specified amount of movement (Step S7). The camera 4 acquires a magnified image of the sample at that position (Step S8). The acquired magnified image is stored in the storage section 7, together with the focus state, that is, the position of the stage 2 (Step S9).

The control section 6 determines whether image acquisition in all scheduled small regions B has been completed (Step S10). If image acquisition therein has not been completed, the control section 6 increments the counter N (Step S2) and moves the stage 2 in the horizontal direction until the optical axis of the objective lens 3 is aligned with the center of the next small region B according to the order specified in advance (Step S3). The focus sensor 5 detects the focus position (Step S4). Then, the focus state in which the adjacent magnified image was acquired and that is stored in the storage section 7 is read from the storage section 7 (Step S11). The amount of change of the detected focus position with respect to the read focus state is calculated (Step S12). It is determined whether the amount of change is equal to or less than a threshold (Step S13).

If the amount of change is equal to or less than the threshold, a fixed number M is initialized (Step S14), and then, the stage 2 is moved in the vertical direction such that the focal position of the objective lens 3 matches the detected focus position.

On the other hand, if the amount of change exceeds the threshold, it is determined whether the fixed number M is equal to 1 (Step S15). If the fixed number M is not equal to 1, the amount of movement of the stage 2 is set to a limited amount of movement that falls within the range of the depth of focus of the objective lens 3, specified in advance (Step S16), and the fixed number M is incremented (Step S17). The control section 6 moves the stage 2 in the vertical direction by the set amount of movement (Step S7). A magnified image of the sample is acquired by the camera 4 at that position (Step S8). The acquired magnified image is stored in the storage section 7 together with the focus state, that is, the position of the stage 2 (Step S9).

If it is determined in Step S15 that the fixed number M is equal to 1, the fixed number M is initialized (Step S18). The amount of movement to a position matching the focus position detected by the focus sensor 5 is set (Step S6). The control section 6 moves the stage 2 in the vertical direction by the set amount of movement (Step S7). A magnified image of the sample is acquired by the camera 4 at the position reached after the movement (Step S8). The acquired magnified image is stored in the storage section 7 together with the focus state, that is, the position of the stage 2 (Step S9).

In this way, according to the microscope apparatus 1 and the microscope observation method of this embodiment, it is possible to prevent the focus state from being changed by a large amount beyond the depth of focus of the objective lens between adjacently acquired magnified images and to prevent seams between magnified images from being noticeable. As a result, an acquired virtual slide can be observed as a series of consecutive images between which seams are not noticeable. In particular, even when the focus state is changed due to dust attached to a surface of the sample, it is possible to avoid a situation in which an out-of-focus magnified image is acquired because of the change and to provide a sharp virtual slide.

When the focus position is changed by a large amount beyond the depth of focus of the objective lens twice in a row between three adjacent magnified images, the focus state adjustment limitation is cancelled; therefore, the focus state can be adjusted by tracing the inclination of the sample itself.

According to the microscope apparatus 1 and the microscope observation method of this embodiment, the focus state adjustment limitation is cancelled when the focus position is changed by a large amount twice in a row. However, instead of this, any number of times equal to or larger than three times may be set. In that case, the determination condition in Step S15 just needs to be set to that number.

By doing so, it is possible to determine that the change in focus position is not caused by foreign matter, such as dust, but is caused by a change in the height of the sample or is caused because of a high possibility that the slide is inclined, and to prevent the occurrence of a situation in which the sample is not focused on because the adjustment in the focus state is limited. Specifically, priority is given to acquiring a sharp magnified image over making a seam less noticeable.

The focus state is adjusted based on the focus state in which an adjacent magnified image was previously acquired. However, instead of this, the focus state may be adjusted based on a plurality of adjacent magnified images. For example, in the example shown in FIG. 2, when a magnified image of a small region B indicated by reference symbol c2 is acquired, since the magnified images of small regions B indicated by reference symbols c1 and d2, which are adjacent thereto, have already been acquired, the focus state may be adjusted such that the amount of change from each of the focus states in which those magnified images were acquired is limited to within the threshold, which is the range of the depth of focus of the objective lens 3.

According to the microscope apparatus 1 and the microscope observation method of this embodiment, when a plurality of adjacent magnified images exist, the focus state adjustment section 6 may limit the adjustment in the focus state to the predetermined threshold (for example, the depth of focus of the objective lens) or less, with respect to a focus position obtained when an adjacent magnified image having the largest amount of change in focus position was acquired.

By doing so, a virtual slide can be generated in which a seam between a magnified image adjacent to a plurality of magnified images and each of the adjacent magnified images is made less noticeable.

In this embodiment, the focus sensor, which detects the focus position by using the contrast in an image acquired by the camera 4, is shown as an example. However, instead of this, any other distance sensor, such as an infrared distance sensor, can be used to detect the focus position.

When the amount of change in the focus position is large, the amount of adjustment in the focus state may be set to any value within the depth of focus of the objective lens.

What is claimed is:

1. A microscope apparatus comprising:
an objective lens that collects light from a plurality of adjacent regions forming a sample on a slide;
a focus position detecting section that detects a focus position of the objective lens with respect to each one of the adjacent regions of the sample;
a focus state adjustment section that adjusts a focus state with respect to one of the adjacent sample regions based on a detection result from the focus position detecting section, wherein the focus state adjustment section adjusts the focus state by adjusting the distance between the objective lens and the slide; and
a magnified-image acquisition section that acquires a plurality of magnified images using the objective lens, each magnified image corresponding to a respective one of the adjacent regions forming the sample,
wherein, if the focus position detected by the focus position detecting section for a particular region differs by more than a predetermined threshold with respect to a focus state of an adjacent magnified region, then the focus state adjustment section limits the adjustment in the focus state for the particular region to the predetermined threshold or less.

2. A microscope apparatus according to claim 1, wherein the predetermined threshold is a depth of focus of the objective lens.

3. A microscope apparatus according to claim 1, further comprising an image combining section that generates a virtual slide of the sample by combining the plurality of magnified images forming the regions acquired by the magnified-image acquisition section.

4. A microscope apparatus according to claim 1, wherein the focus state adjustment section limits the adjustment in the focus state to the predetermined threshold or less, with respect to a focus position obtained based upon a magnified image of an adjacent region that would present the largest amount of change in focus position.

5. A microscope apparatus according to claim 1, wherein the magnified-image acquisition section is driven so as to sequentially acquire the magnified images of the adjacent regions forming the sample on the slide.

6. A microscope apparatus according to claim 5, wherein the focus state adjustment section cancels the focus state adjustment limitation when the amount of change in focus position exceeds the predetermined threshold a plurality of times in a row, in acquiring three or more consecutive adjacent magnified image regions.

7. A microscope observation method comprising the steps of:
    detecting a focus position of an objective lens that collects light from a sample on a slide, with respect to each of respective adjacent regions of the sample;
    determining whether the detected focus position of one of the respective regions is changed by more than a predetermined threshold with respect to a detected focus position of one of the acquired adjacent region;
    adjusting the focus state so as to match the detected focus position when the amount of change in focus position is the predetermined threshold or less, and limiting the adjustment in the focus state to the predetermined threshold or less when the amount of change in focus position exceeds the predetermined threshold, wherein the adjustment in the focus state is an adjustment in the distance between the objective lens and the slide; and
    acquiring a magnified image of the region of the sample for which the focus state has been adjusted.

8. A microscope observation method according to claim 7, wherein the predetermined threshold is a depth of focus of the objective lens.

* * * * *